US009823498B2

(12) United States Patent
Whelan-Curtin et al.

(10) Patent No.: US 9,823,498 B2
(45) Date of Patent: Nov. 21, 2017

(54) OPTICAL MODULATOR WITH PLASMON BASED COUPLING

(71) Applicant: UNIVERSITY COURT OF THE UNIVERSITY OF ST ANDREWS, St Andrews (GB)

(72) Inventors: William Whelan-Curtin, Fife (GB); Kapil Debnath, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 14/908,228

(22) PCT Filed: Jun. 16, 2014

(86) PCT No.: PCT/GB2014/051844
§ 371 (c)(1),
(2) Date: Jan. 28, 2016

(87) PCT Pub. No.: WO2015/015148
PCT Pub. Date: Feb. 5, 2015

(65) Prior Publication Data
US 2016/0170242 A1    Jun. 16, 2016

(30) Foreign Application Priority Data

Jul. 30, 2013    (GB) .................................. 1313592.6

(51) Int. Cl.
*G02F 1/025* (2006.01)
*G02F 1/015* (2006.01)

(52) U.S. Cl.
CPC ...... *G02F 1/025* (2013.01); *G02F 2001/0156* (2013.01); *G02F 2202/105* (2013.01); *G02F 2203/10* (2013.01)

(58) Field of Classification Search
CPC ......... G02F 2203/10; G02F 2001/0152; G02F 1/01; G02F 2201/58; G02B 2006/12061; G02B 5/008
(Continued)

(56) References Cited

U.S. PATENT DOCUMENTS 6,376,897 B2 * 4/2002 Yamada ............. H01L 29/1008
257/347
6,653,179 B1 * 11/2003 Minegishi .......... H01L 21/2026
257/E21.134
(Continued)

FOREIGN PATENT DOCUMENTS

DE        102006002732 A1 *  8/2007 ........... G01S 7/4816
WO    WO 2007/118714 A1   10/2007

OTHER PUBLICATIONS

Robert et al., "Photonic Mixer Device and method for its operation", Google Translation of DE 102006002732.*
(Continued)

*Primary Examiner* — Ellen Kim
(74) *Attorney, Agent, or Firm* — Sheridan Ross P.C.

(57) ABSTRACT

A device comprising a metal layer on a crystalline silicon substrate, and a waveguide that has a refractive index greater than that of the crystalline silicon, wherein the waveguide is arranged to couple light to a surface plasmon mode at an interface between the silicon substrate and the metal layer when a waveguide mode is phase matched to the surface plasmon mode.

11 Claims, 5 Drawing Sheets

(58) Field of Classification Search
USPC .................................... 385/3, 129; 356/449
See application file for complete search history.

(56) References Cited

U.S. PATENT DOCUMENTS

| | | | | |
|---|---|---|---|---|
| 6,825,528 | B2* | 11/2004 | Iwata | H01L 21/2251 257/336 |
| 8,538,223 | B2* | 9/2013 | Zhang | B82Y 20/00 385/131 |
| 2007/0104441 | A1* | 5/2007 | Ahn | G02B 6/12004 385/129 |
| 2008/0084597 | A1* | 4/2008 | Hamada | G02F 1/011 359/237 |
| 2009/0103099 | A1* | 4/2009 | Debackere | B82Y 20/00 356/445 |
| 2009/0134486 | A1* | 5/2009 | Fujikata | H01L 31/1085 257/449 |
| 2012/0288228 | A1* | 11/2012 | Saito | G02B 6/122 385/14 |
| 2014/0099052 | A1* | 4/2014 | Takaoka | G02F 1/025 385/2 |
| 2016/0047979 | A1* | 2/2016 | Yoshida | G02B 6/13 427/527 |

OTHER PUBLICATIONS

International Search Report and Written Opinion prepared by the European Patent Office dated Aug. 22, 2014, for International Application No. PCT/GB2014/051844.

Avrutsky I: "Integrated Optical Polarizer for Silicon-on-Insulator Waveguides Using Evanescent Wave Coupling to Gap Plasmona Polaritons", IEEE Journal of Selected Topics in Quantum Electronics, IEEE Service Center, Piscataway, NJ, US, vol. 14, No. 6, Nov. 1, 2008 (Nov. 1, 2008), pp. 1509-1514, XP011344172.

Roney Thomas et al: "Plasmonic Modulators for Near-Infrared Photonics on a Silicon-on-Insulator Platform", IEEE Journal of Selected Topics in Quantum Electronics, IEEE Service Center, Piscataway, NJ, US, vol. 19, No. 3, May 1, 2013 (May 1, 2013), p. 4601708, XP011505807.

Emboras A et al: "Efficient coupler between silicon photonic and metal-insulator-silicon-metal plasmonic waveguides", Applied Physics Letters, American Institute of Physics, US, vol. 101, No. 25, Dec. 17, 2012 (Dec. 17, 2012), pp. 251117-251117, XP012168478.

Inga A. Fischer et al: "Towards electrical detection of plasmons in all-silicon pin-diodes", Physica Status Solidi (B), vol. 249, No. 4, Feb. 24, 2012 (Feb. 24, 2012), pp. 773-777, XP055135543.

Pierre Berini: "Surface Plasmon photodetectors", Proceedings of SPIE, vol. 8771, May 6, 2013 (May 6, 2013), p. 877100, XP055135578.

Han Jiaguang et al: "Terahertz transmission in subwavelength holes of asymmetric metal-dielectric interfaces: The effect of a dielectric layer", Journal of Applied Physics, American Insitute of Physics, US, vol. 103, No. 3, Feb. 14, 2008 (Feb. 14, 2008), pp. 33108-33108, XP012109221.

* cited by examiner

OPTICAL MODULATOR WITH PLASMON BASED COUPLING

CROSS REFERENCE TO RELATED APPLICATIONS

This application is a national stage application under 35 U.S.C. 371 and claims the benefit of PCT Application No. PCT/GB2014/051844 having an international filing date of 16 Jun. 2014, which designated the United States, which PCT application claimed the benefit of Great Britain Application No. 1313592.6 filed 30 Jul. 2013, the disclosure of each of which are incorporated herein by reference.

FIELD OF THE INVENTION

The present invention relates to an optical modulator, and in particular a plasmon based optical modulator. The modulator of the invention may be used for optical interconnects in, for example, computers.

BACKGROUND OF THE INVENTION

Current computers are increasingly limited by power consumption and heat dissipation issues, roughly clamping the clock rate of the Central Processing Unit (CPU) at ~3-4 GHz since around 2004. Most of this power (50-80%) is consumed in interconnects, i.e. the metal traces that move information around and on/off the chip. As these wires have become thinner and data-rates faster the overall energy efficiency has plummeted. This is one of the biggest challenges facing the computer industry today.

Optical interconnects are seen as the solution to this problem. Electrical data generated from electronic circuitry is encoded into a beam of light using an electro-optic modulator, transmitted via an optical cable/waveguide and converted back into electrical data using photo-detectors at the receiving end. Unlike an electrical wire, the limit on data transmission in an optical waveguide can be as high as 100 Tbit/s and data transfer at high bit rates is much more energy efficient.

In silicon based optical interconnects, there are primarily two modulation techniques employed: (a) interference based modulation, typically using Mach-Zehnder Interferometer (MZI) type modulators, and (b) resonance based modulation, typically using ring resonators. FIG. 1 shows a top view and a cross sectional view of (a) a MZI based modulator and (b) a ring resonator based modulator. In both cases, a thick oxide cladding (~2 μm) is required to guide light in top silicon layer In MZI modulators, optical modulation is achieved by changing the refractive index of one of the arms. This creates a phase difference between the two arms. By modulating this phase difference constructive and destructive interference can be achieved. This gives rise to intensity modulation at the output of the modulator. In ring resonator based modulators, the basic principle is to tune the ring in and out of resonance by changing its refractive index. In both these approaches, a material incompatibility arises when combining electronics and optics on the same silicon platform. This is because conventional optical waveguiding techniques require a lower cladding generally in the form of a thick buried oxide layer to guide light (as shown in FIG. 1). When integrated with electrical circuits such a layer traps heat in the electrical components, for example the transistors, and so reduces the integration density. This is unacceptable to the electronics industry. As a result, true integration of optical components with CMOS circuitry is not possible with conventional optical interconnect techniques.

SUMMARY OF THE INVENTION

According to one aspect of the invention, there is provided a device comprising a metal layer on a crystalline silicon substrate, and a waveguiding layer that has a refractive index greater than that of the crystalline silicon, wherein the waveguide is arranged to couple light to a surface plasmon mode at an interface between the silicon substrate and the metal when a waveguide mode is phase matched to the surface plasmon mode. The waveguide may be an amorphous silicon waveguide. A dielectric layer may be provided between the metal layer and the waveguide.

Surface plasmons are coherent electron oscillations at the interface between any two materials where the real part of the dielectric function changes sign across the interface (e.g. a metal-dielectric interface). A surface plasmon mode can be guided by a single interface between a metal and a dielectric. To excite a surface plasmon mode at a metal-dielectric interface a dielectric waveguide can be used. Light can couple from the waveguide to the surface plasmon mode.

By using surface plasmon modes to guide light between bulk silicon and a metal layer the need for any bottom cladding layer can be avoided. This allows a simple implementation of the device in an electro-optic circuit allowing front-end integration with minimal changes to electrical device manufacturing processes currently in use (for example CMOS).

The device may comprise means of modulating the refractive index of the crystalline silicon substrate to change a phase matching condition between the surface plasmon mode and waveguide mode to modulate light carried by the amorphous silicon waveguide.

The means of modulating may be operable to accumulate or deplete carrier density in the crystalline silicon.

The means for modulating may comprise an electrical device formed in or on the crystalline silicon substrate. The electrical device may comprise a pin junction. The electrical device may comprise a Schottky junction at the metal-silicon substrate interface.

A thin oxide layer may be provided between the crystalline silicon substrate and the metal to form an electrical device comprising a MOS capacitor.

The waveguide may be created by ion-implantation of partially amorphous silicon.

According to another aspect of the invention, there is provided an electrical circuit comprising at least one optical interconnect that includes at least one device according to the first aspect of the invention.

According to yet another aspect of the invention there is provided a method for forming an amorphous silicon waveguide comprising using ion implantation to distort crystalline silicon.

BRIEF DESCRIPTION OF THE DRAWINGS

Various aspects of the invention will now be described by way of example and with reference to the accompanying drawings, of which.

DETAILED DESCRIPTION

The invention uses surface plasmon modes to guide light using a single interface between a metal and a dielectric. To excite a surface plasmon mode at a metal-dielectric interface, a dielectric waveguide is used. The waveguide has a higher refractive index than the bulk substrate, where the surface plasmon mode exists.

Figure 1:
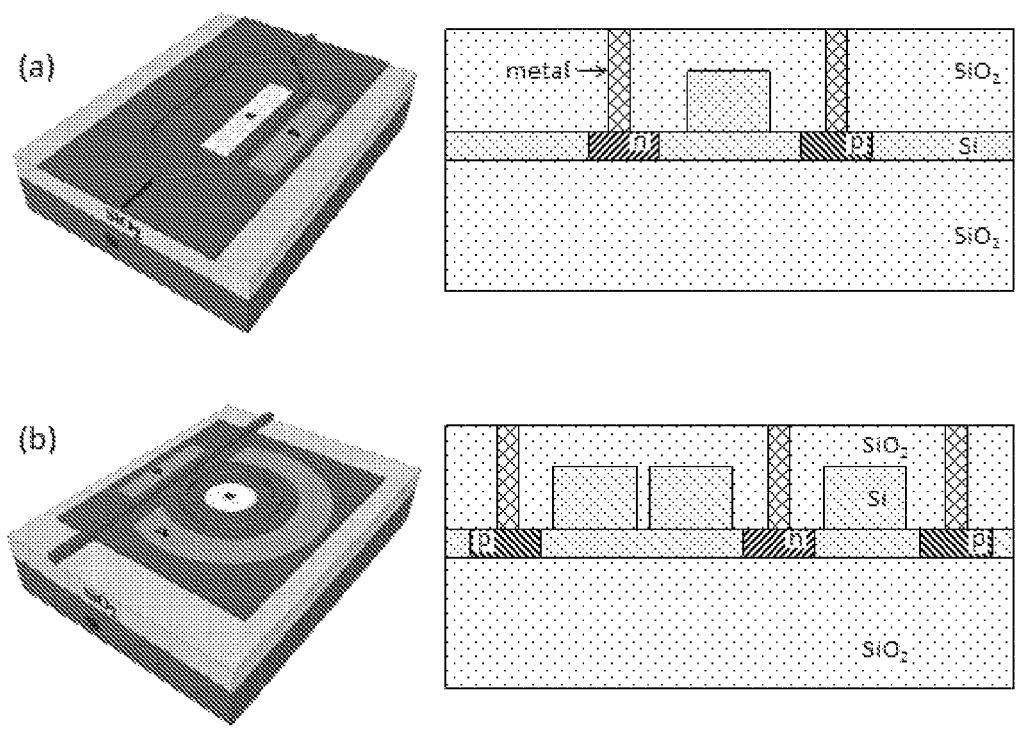
Figure 2:
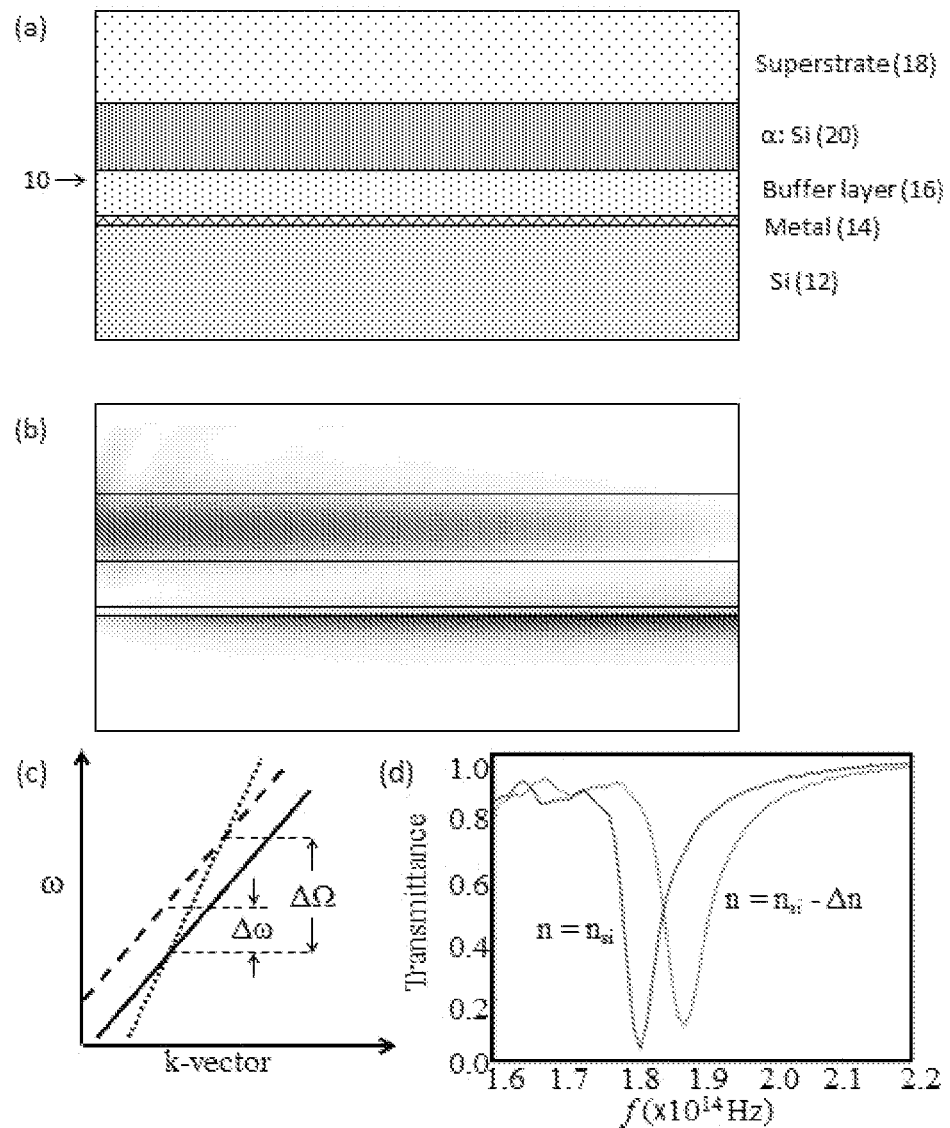
FIG. 2(a) is a cross section through a surface plasmon based coupler.
FIG. 2(b) is a simulation of magnetic field distribution under phase matching condition for the structure of FIG. 2(a)
FIG. 2(c) shows dispersion relations for the structure of FIG. 2(a)
FIG. 2(d) shows simulated transmission spectra for different refractive indices of the bulk silicon layer of the coupler of FIG. 2(a)

FIG. 2(a) shows a cross sectional view of a surface plasmon coupling structure 10. This has a bulk silicon substrate 12, and a thin metal layer 14, for example aluminium, on the bulk substrate 12. On the metal 14 is a low refractive index buffer layer 16. Between an upper cladding layer 18 and the buffer 16 is an amorphous silicon waveguide 20. This has a higher refractive index than the bulk silicon substrate 12. The thickness of the metal layer 14 is typically in the range 5 to 100 nm, for example in the range 30 to 40 nm. The thickness of the buffer layer 16 can be in the range 1 to 500 nm, for example 200 nm. However, this may vary considerably depending on the application. The waveguide 20 has a thickness in the range 100 nm to 1 micron.

Light is launched at an input port of the amorphous silicon waveguide 20. Under phase matching conditions, when the waveguide mode has the same k-vector as the surface plasmon mode, light transfers from the waveguide mode to the lossy surface plasmon mode at the metal-dielectric interface. This results a dip in transmission spectrum at the output of the waveguide.

When the refractive index of the dielectric 12 under the metal 14 changes ($\Delta n$), the dispersion relation of the surface plasmon mode shifts ($\Delta \omega = \omega \times \Delta n/n$). However, as the dip in transmission is given by the phase matching conditions, the intersection point changes in both frequency and k-vector resulting in a frequency shift $\Delta \Omega$ of the transmission dip that can be much larger than $\Delta \omega$. This sensitivity value can be above 10,000/RIU, which is ideal for modulators based on the weak electro-optic effects of silicon. It also provides a broad bandwidth that is useful for many applications.

FIG. 2(b) shows a simulated magnetic field distribution under phase matching condition for the structure of FIG. 2(a). FIG. 2(c) shows dispersion relations for the structure of FIG. 2(a). These show extremely high sensitivity of the coupling between waveguide mode and surface plasmon mode. The red curve gives a portion of the dispersion curve of the surface plasmon mode. The red dashed curve shows the curve after a change in refractive index of the bottom silicon layer. The blue curve shows the dispersion relation of the waveguide mode. FIG. 2(d) shows simulated transmission spectra at the amorphous silicon waveguide output for different refractive index of the bulk silicon layer.

Figure 3:
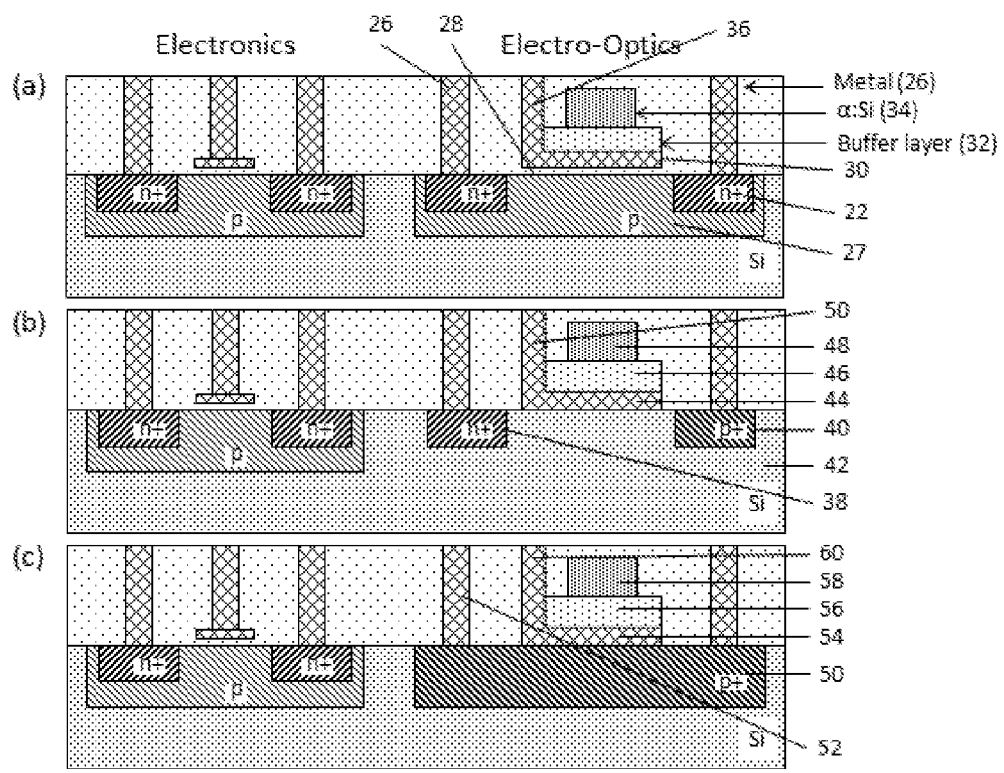
FIG. 3 is shows an electro-optic modulator based on (a) a MOS capacitor, (b) a p-i-n diode, and (c) a Schottky diode beside a MOS field effect transistor.

FIG. 3 shows various electrical devices integrated with the optical structure 10 of FIG. 2(a) on a conventional CMOS chip.

FIG. 3(a) is an electro-optic device that uses a metal-oxide-silicon interface of a typical MOS capacitor for supporting a surface plasmon mode. The electro-optic device of FIG. 3(a) has two heavily doped n-type regions 22 formed in bulk p-type silicon 24. Metal contacts 26 are electrically coupled with the heavily doped n-type regions 22. Between the two n-type regions 22 is a p-type region 27 on which a thin layer 28 of low refractive index material is formed. On top of this, a thin metal layer 30 is deposited to form the metal-oxide-silicon interface. On the metal layer 30 is a buffer oxide layer 32 on top of which is an amorphous silicon waveguide 34. To allow voltage to be applied to the metal layer an electric contact 36 is provided.

The evanescent tails of the waveguide mode and the surface plasmon mode overlap in the buffer oxide layer. When the phase matching condition is achieved, light is transferred from top waveguide to the surface plasmon mode and a dip in transmission spectrum at the output is observed. With an applied voltage at the gate of the MOS capacitor, carriers will be depleted or accumulated under the metal, giving rise to a change in refractive index and a consequent shift in the dip in transmission spectrum. This allows very high speed modulation, which can also be very efficient due to the low resistance and capacitance of this configuration. The use of a surface plasmon mode to control the optical intensity in the top waveguide allows monolithic integration of an electro-optic modulator on a conventional CMOS chip.

FIG. 3(b) shows an electro-optic modulator based on a p-i-n silicon diode. This has a heavily doped n-type region and a heavily doped p-type region in bulk p-type silicon. Metal contacts are electrically coupled with the heavily doped n-type and p-type regions 38 and 40 respectively. Between the n-type and p-type regions 38 and 40 is a region of p-type bulk silicon 42 on which a thin metal layer 44 is deposited. Above the metal layer 44, there may be a buffer oxide layer 46 on top of which is the waveguiding layer 48. To allow voltage to be applied to the metal layer 44 an electric contact 50 is provided. In this configuration, modulation in refractive index under the metal layer 44 is achieved by changing the carrier density in the intrinsic region of the p-i-n diode by applying a forward bias.

As before, the evanescent tails of the waveguide mode and the surface plasmon mode overlap (when there is a buffer oxide layer 46, the overlap occurs in the buffer 46). When the phase matching condition is achieved, light is transferred from top waveguide 48 to the surface plasmon mode and a dip in transmission spectrum at the output is observed. By varying the forward bias applied to the diode, carriers will be depleted or accumulated under the metal 44, giving rise to a change in refractive index and a consequent shift in the dip in transmission spectrum.

FIG. 3(c) shows an electro-optic modulator based on a Schottky barrier at a metal-silicon interface. The modulator is formed on a heavily doped p-type region 50 in bulk silicon. Two metal contacts 52 are electrically coupled with the heavily doped p-type region 50 between which a metal layer 54 is deposited. As before, on the metal layer 54 is a buffer layer 56 on top of which is an amorphous silicon waveguide 58. To allow voltage to be applied to the metal layer 54 an electric contact 60 is provided. By applying voltage modulation at the metal layer 54, the depletion region under the metal layer 54 can be modified, giving rise to a modulation in the refractive index of the bulk silicon under the metal layer 54.

Figure 4:
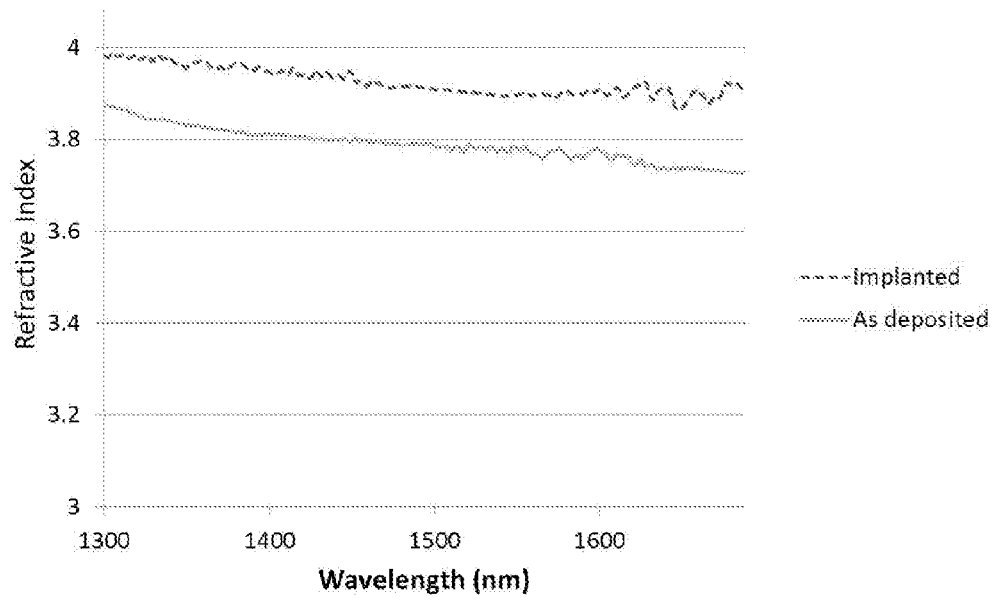
FIG. 4 shows ellipsometry measurements of amorphous silicon before and after implanatation.

The electro-optic device of the present invention can be made using standard processing techniques. In one embodiment, the top waveguide comprises a high refractive index amorphous silicon waveguiding layer. The amorphous silicon may be deposited using Chemical Vapour Deposition, a standard processing tool. As deposited, such material is rarely 100% amorphous having refractive indices in the 3.7-3.8 range. By implanting this layer with high energy silicon ions (160 keV with a dose of 2e15 per $cm^2$, it can be fully amorphized allowing the realization of the required higher (3.95) refractive index. FIG. 4 shows ellipsometry measurements of amorphous silicon before and after implanatation. Very low propagation losses have been demonstrated for amorphous silicon [Electronics Letters 41, 1377-1379 (2005), the contents of which are incorporated herein by reference] making them ideal for the realisation photonic integrated circuits. In another embodiment, a silicon germanium or germanium layer may be deposited to provide the top waveguide. This layer may exhibit refractive indices of 4-4.5 in the wavelength range of interest. By adjusting the silicon fraction, the absorption coefficient may be adjusted to give low losses at the telecoms wavelengths.

Figure 5:
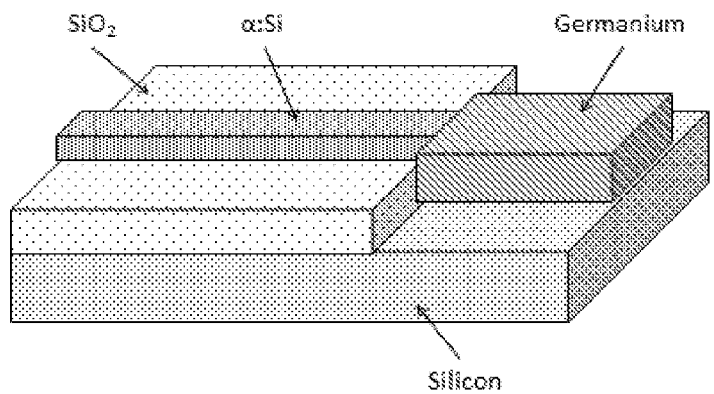
FIG. 5 is a cross section through a surface plasmon based coupler butt coupled to a germanium photodiode.

The invention allows optics and traditional electronics to be integrated thus allowing on-chip optical interconnects without compromising the integration density of the electronics. Due to the extremely sensitive coupling mechanism, this design operates at low power despite the weak electro-optic properties of silicon that are essential for data communications. This technique could also be used to couple light into low capacitance all silicon-photodiodes similar to those described in Nano Letters 11, 2219-2224 (2011), the contents of which are incorporated herein by reference, thus completing the optical link. Alternatively, conventional Germanium Photodiodes [Optics Express 20, 1096-1101 (2012), the contents of which are incorporated herein by reference] may be used. Integrating these is straightforward, for example, the germanium may be grown direct on the silicon substrate and the top waveguide butt coupled or evanescently coupled to the germanium, see FIG. 5.

Figure 6:
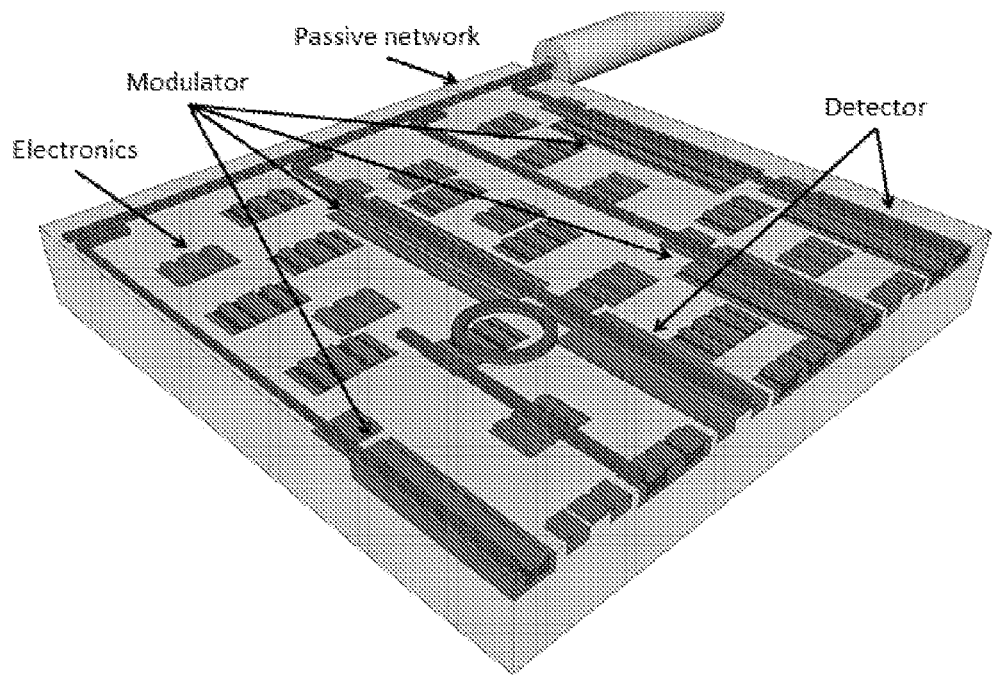
FIG. 6 is a 3D view of a CMOS chip with on-chip optical interlink.

FIG. 6 shows a 3D view of a section of a CMOS chip with on-chip optical interconnects based of the modulator design discussed above. For clarity, in FIG. 6 only local electrical interconnects are shown and intermediate and global interconnects are not shown. The optical components are distributed in two layers. All active optical components, such as modulators and detectors are on a bulk silicon substrate layer along with all electronic components, whereas all passive components such as waveguides, directional couplers, splitters, thermo-optic switches etc. are in an α:Si access layer.

Light from a high power off-chip laser source is coupled into the passive network. This can be done using, for example, butt-coupling techniques (as shown in FIG. 6) or grating couplers. Cheap high power (500-1000 mW) laser sources are now available. Using suitable multiplexors many channels for on-chip communications may be provided (for example thousands each carrying 100 uW). A traditional drawback of these lasers is their large spectal bandwidth (10s nm) making them unsuitable for many systems. The wide bandwidth of the modulator described here is ideally suited to working with such a light source providing a frame work for on-chip optical networks. Due to the relatively high refractive index of α:Si in comparison to silicon, light is mainly confined in the passive network and coupled to the bulk silicon at the modulator or detector regions whenever the phase matching condition is satisfied. The use of a surface plasmon mode to guide light in a bulk silicon substrate allows the full potential of optical components as well as electrical circuits to be realised on the same platform.

Figure 7:
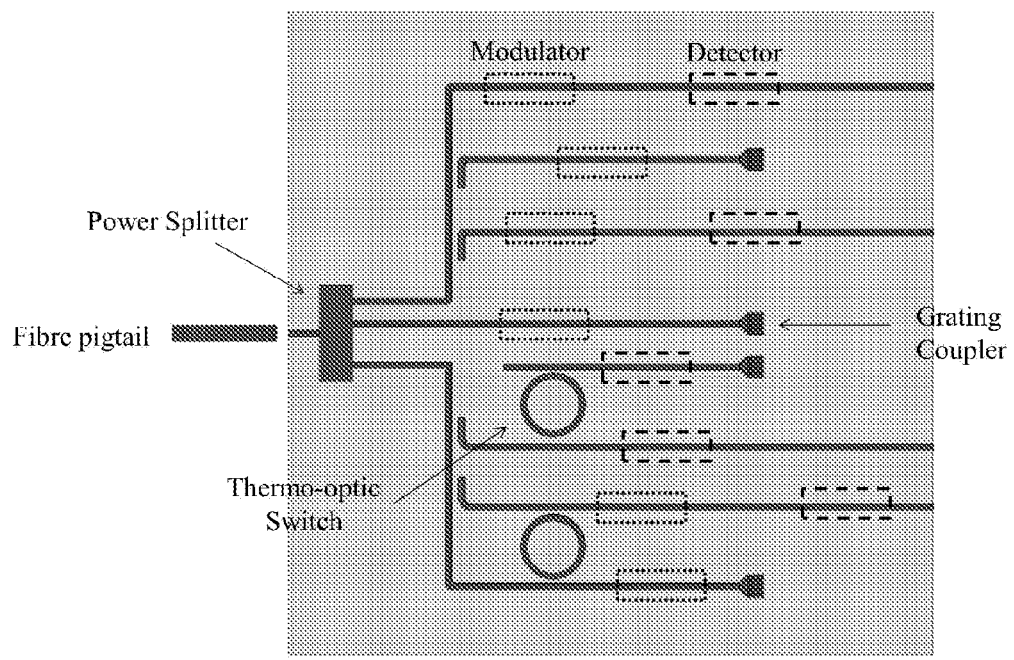
FIG. 7 is a top view of a CMOS chip with an on-chip and off-chip optical interlink.

FIG. 7 shows a top view of an α:Si passive network. This design is suitable for both on- and off-chip interconnects.

A skilled person will appreciate that variations of the disclosed arrangements are possible without departing from the scope of the invention. Accordingly the above description of the specific embodiment is made by way of example only and not for the purposes of limitations. It will be clear to the skilled person that minor modifications may be made without significant changes to the operation described.

The invention claimed is:

1. An electro-optic device, comprising:
   a metal layer on a crystalline silicon substrate;
   a waveguide that has a refractive index greater than that of the crystalline silicon substrate, wherein the waveguide is arranged to couple light to a surface plasmon mode at an interface between the crystalline silicon substrate and the metal layer when a waveguide mode is phase matched to the surface plasmon mode; and
   a modulator for modulating the refractive index of the crystalline silicon substrate to change a phase matching condition between the surface plasmon mode and the waveguide mode to modulate light carried by the waveguide.

2. The electro-optic device as claimed in claim 1, further comprising a dielectric layer between the metal layer and the waveguide.

3. The electro-optic device as claimed in claim 2, wherein the modulator is operable to accumulate or deplete the carrier density in the crystalline silicon substrate.

4. The electro-optic device as claimed in claim 2, wherein the modulator comprises an electrical device formed in or on the crystalline silicon substrate.

5. The electro-optic device as claimed in claim 4, wherein the electrical device comprises a pin junction.

6. The electro-optic device as claimed in claim 4, wherein the electrical device comprises a Schottky junction at the metal-silicon substrate interface.

7. The electro-optic device as claimed in claim 1, wherein a thin oxide layer is provided between the crystalline silicon substrate and the metal.

8. The electro-optic device as claimed in claim 1, wherein the waveguide comprises amorphous silicon or Silicon Germanium or Germanium.

9. The electro-optic device as claimed in claim 1, wherein the waveguide is created by ion-implantation.

10. The electro-optic device as claimed in claim 1, wherein the waveguide is an amorphous silicon waveguide created by ion-implantation.

11. An electrical circuit comprising at least one optical interconnect that includes at least one electro-optic device as claimed in claim 1.

* * * * *